Patented Feb. 27, 1945

2,370,517

UNITED STATES PATENT OFFICE 2,370,517

INSOLUBILIZATION OF WATER-SOLUBLE CELLULOSE ETHERS

Shailer L. Bass, Richard M. Upright, and Firth L. Dennett, Midland, Mich., assignors to The Dow Chemical Company, Midland, Mich., a corporation of Michigan No Drawing. Application August 7, 1941, Serial No. 405,786

8 Claims. (Cl. 260—15)

This invention relates to a method of insolubilization of water-soluble cellulose ethers, whereby such ethers are made to be insoluble in organic solvents and substantially insoluble in water. It relates in particular to such a method applied to methyl cellulose of the water-soluble type.

Water-soluble cellulose ethers have certain characteristics which make them superior for some purposes to their organo-soluble counterparts. Their solubility in water also is an advantage, particularly where economy of operation and freedom from the expense and hazard incident to the use of volatile organic solvents is desired. At the same time, water-solubility may not be a desirable attribute in the finished article, whether it be free film, filament or a coating on paper, cloth, or like flexible base. Thus, for abrasion-resistance of the article and for simplicity and economy of operation in producing the same, it may be desired to use a water solution of a water-soluble cellulose ether. It may, at the same time, be desired to have the finished article insoluble, or substantially so, in water and insoluble in organic solvents. Further, it may be desired that the cellulose ether in the finished article exhibit flexibility and possess a degree of clarity comparable with the corresponding properties of the customary organo-soluble cellulose ethers which might be used for analogous purposes.

It is, accordingly, an object of the invention to provide a method whereby water-soluble cellulose ethers may be employed in, or applied from, water solution and then insolubilized, both as regards water and organic solvents, by simple and inexpensive means. Another object is to provide a predominantly cellulose ether composition, where the cellulose ether is of the water-soluble type, which is capable of being converted easily to a substantially water-insoluble form. A particular object of the invention is to provide a method and a composition as aforesaid whereby water-soluble methyl cellulose may be converted to an insoluble form. Other and related objects will appear hereinafter.

In a prior filed application, Serial 358,423, filed September 26, 1940, and now U. S. Patent No. 2,270,180, two of the present inventors have reported that the foregoing objects may be attained through the use, as an insolubilizing agent, of a water-soluble polyhydric alcohol modified urea formaldehyde resin to be added to a water solution of a water-soluble cellulose ether. According to the said prior application, films deposited from such solution when dried and baked are insolubilized with respect to organic solvents and are substantially insolubilized with respect to water.

According to the present invention, insolubilization of water-soluble cellulose ethers may be attained to a greater extent than by the method of the above-identified prior application, by forming a water solution of a water-soluble cellulose ether and a water-soluble and heat-hardenable melamine resin, particularly a water-soluble melamine aldehyde resin, forming a film or filament from the solution, then drying and heating the same. More particularly, films, filaments, and the like, which are insoluble in organic solvents and substantially insoluble in water, are prepared by adding from 2 to 15 per cent, and preferably from 5 to 15 per cent, based on the total weight of solids present, of a melamine resin in water solution to a water solution of a water-soluble cellulose ether, preferably, though not necessarily, adjusting the pH of the resulting solution to a range of 4 to 5, and forming the above-mentioned films, filaments, or the like, from this resulting solution. After drying in air at room temperature the structure obtained is heated for at least 5 minutes and ordinarily for not more than 60 minutes to a temperature preferably in the range from 105 to 110° C. This treatment provides a highly flexible article which is substantially insoluble in water and in the common organic solvents. As will be shown hereinafter the articles produced according to the present method are, for any given proportion of ingredients and time and temperature of treatment, more resistant to water than are those described in the above-identified co-pending application.

The cellulose ethers here concerned are any which are soluble in water and include such products as, for example, water-soluble methyl cellulose, water-soluble hydroxy-ethyl cellulose, and the water-soluble alkali salts and ammonium salt of cellulose glycolic acid. It is, of course, well known in the art that the water-soluble cellulose ethers contain in general more etherifying groups per $C_6$ unit than do the alkali-soluble cellulose ethers and they contain fewer etherifying groups per $C_6$ unit than do the corresponding organic solvent-soluble cellulose ethers. The invention is directed to a treatment of those ethers of cellulose which are capable of remaining in solution in water without the use of strong alkalies.

Among the melamine resins which may be used in the present invention are any of those resinous condensation products of melamine (2.4.6 triamino-s-triazine) with aldehydes such as formaldehyde, which are heat-hardenable and are soluble in water. A method of preparing one melamine formaldehyde resin which has been found to be satisfactory for use in the present invention and to be typical in its behavior of all of the water-soluble, heat-hardenable melamine resins with which we are familiar, is given herewith.

1 mol of melamine is caused to condense with 35 per cent aqueous formaldehyde at a pH of approximately 8 in aqueous medium containing 7 mols (a slight excess) of formaldehyde. The condensation is carried out at a temperature of 45 to 60° C. at a reduced pressure of about 100 millimeters absolute. The reduced pressure is maintained until about 70 to 80 per cent of the water originally present and of that formed during the reaction has been removed. The resulting partly dehydrated mass has a viscosity of about 100 poises. This viscous product is then heated to 90° C. in the course of about one hour in the presence of a slight excess over the theoretical 3 mols of diethylene glycol. The temperature is gradually raised to about 120° C. in the course of about 5 hours and the mixture held at this temperature at atmospheric pressure until the desired water-solubility of the melamine formaldehyde condensate is obtained. When this stage is reached there remains in the reaction vessel about 810 grams of resin solution of about 50 per cent concentration for each gram molecular weight of melamine used. Representative batches of the above-described resin have had the following average properties:

Viscosity (Gardner-Holt at 25° C.)_____ W–X
Acid number_____ 0.13
Solvent tolerances:
  Diethylene glycol_____⎫
  Ethylene glycol_____⎬ Infinite
  Water_____⎭
  Methyl alcohol_____⎫
  Monobutyl ether of diethylene glycol___⎬ percent__ 300
  Ethyl alcohol_____do____ 200
  Mineral spirits_____ None In a preferred method of carrying out the invention there is added to a water solution of methyl cellulose an amount of a water-soluble melamine formaldehyde resin equivalent to from about 5 to about 15 per cent of the total weight of solids present, and a small amount of acid, sufficient to lower the pH of the water solution to about 4–5. The solution is used to cast a film or to form a filament or to coat an article and the so-formed product is dried to remove water and then heated for from 5 to 60 minutes at a temperature correspondingly from 170° to 90° C. Preferred, and generally operative temperatures, are those from 105 to 110° C. The lower temperatures require somewhat longer times to arrive at an insoluble product than do the higher temperatures within the recited range. The so-heated articles are substantially insoluble in water and are insoluble, as well, in most common organic solvents.

The suggested amount of melamine resin is about 5 to 15 per cent of the combined weight of that resin and the methyl cellulose. This range of proportions gives the most advantageous results. Lesser amounts of melamine resins such as, for example, from 2 to 5 per cent may be employed. If much less than about 2 per cent of the melamine product is incorporated in the methyl cellulose it is found that no practical amount of heating will give a water-insoluble product. Similarly, if much more than about 15 per cent of the melamine condensate is employed the product obtained, while less soluble in water than is methyl cellulose alone, is more soluble than when from 5 to 15 per cent of resin is used. Further, the use of more than 15 per cent of the melamine condensate materially reduces the degree of flexibility which it is possible to obtain in the finished films, filaments, or coatings.

To illustrate the effect of heating time on the insolubilization of methyl cellulose with a water-soluble melamine-formaldehyde condensate such as that whose preparation is described in detail above, the following table is given. The methyl cellulose employed was one whose 2 per cent solution in water has a viscosity of about 50 centipoises. Films were cast from the solutions, and were dried at room temperature. The films were then heated to 105°–110° C. for the time interval shown in the table. The so-heated films were weighed and were then immersed in water for 48 hours at room temperature (25°–28° C.). After this treatment the film, when not completely dissolved, was removed from the water, dried and re-weighed to determine the loss in weight, from which was computed the per cent water-solubility reported in the table. Water-solubility of the deposited and heated films was determined by immersion of the weighed samples in water for 48 hours at room temperature (25°–28° C.), re-drying and weighing.

Table 1

| Time in minutes at 105°–110° C. | Per cent water-solubility, melamine-formaldehyde condensate, per cent | |
|---|---|---|
| | 2.5 | 13 |
| 0 | 100 | 38.8 |
| 5 | 85.6 | 22.9 |
| 15 | 49.9 | 20.0 |
| 45 | 50.6 | 15.9 |
| 60 | 48.0 | 14.7 |

A further comparison was made between the effect of the above-recited conditions of treatment on a methyl cellulose-melamine condensate composition containing 2.5 per cent of the condensate, and a methyl cellulose-urea-formaldehyde condensate of the water-soluble type containing the same methyl cellulose and 13 per cent of the glycol-modified urea-formaldehyde.

Table 2

| Time in minutes at 105–110° C. | Per cent water-solubility | |
|---|---|---|
| | Methyl cellulose, 97.5 melamine condensate, 2.5 | Methyl cellulose, 87 urea-formaldehyde, 13 |
| 0 | 100 | 76.9 |
| 5 | 85.6 | 72.8 |
| 15 | 49.9 | 55.6 |
| 45 | 50.6 | 50.2 |
| 60 | 48.0 | 43.9 |

It is observed that 2.5 per cent of a water-soluble melamine formaldehyde condensate is fully as effective as an insolubilizing agent for methyl cellulose under the moderate temperature conditions employed as is 13 per cent of a water-soluble glycol-modified urea-formaldehyde condensate, such as is described in the above-identified prior application, No. 358,423. It is further pointed out that much lower temperatures are required to produce a given low solubility rating on the films of the present invention than to produce an equivalent low solubility from a film containing a like amount of the insolubilizing agent of the said prior application.

Films were prepared containing sufficient of a water-soluble melamine formaldehyde condensate and of the glycol-modified urea-formaldehyde condensate of the prior application to have solubility values of about 15 to 25 per cent when heated at 105° C. for 30 minutes. Flexibility of the heated films was determined on the M. I. T. folding endurance tester using a tension of 1500 grams and a test strip 15 millimeters wide.

*Table 3*

| Composition of film | Water solubility | | Double folds to fracture | |
| --- | --- | --- | --- | --- |
| | Time of heating | | Time of heating | |
| | 5 min. | 30 min. | 5 min. | 30 min. |
| 1 {Methyl cellulose, 87%<br>Melamine condensate, 13% | 26 | 17 | 301 | 114 |
| 2 {Methyl cellulose, 87%<br>Urea-formaldehyde, 13% | 69 | 49 | 173 | 121 |
| 3 {Methyl cellulose, 75%<br>Urea-formaldehyde, 25% | 48 | 23 | 60 | 38 |

It is observed that the compositions of the present invention are more flexible than those previously described. When comparing films of equal resin content (Nos. 1 and 2), that of the present invention is 74 per cent more flexible than that of the prior application, when both are heated at 105° C. for 5 minutes, and has the same flexibility, within experimental error, after 30 minutes heating. The film of this invention, heated for 30 minutes, is only about 32 per cent as soluble in water as that of the comparative composition.

When comparing films (Nos. 1 and 3) of approximately equal ultimate water-solubility, in Table 3, above, that of the present invention is 400 per cent more flexible after only 5 minutes at 105° C. than is the comparative film, and is 200 per cent more flexible after 30 minutes heating at the same temperature.

The methyl cellulose of the foregoing examples has been given purely as an example of a water-soluble cellulose ether. In like manner to that described, a film, deposited from a water solution of 80 parts of hydroxy-ethyl cellulose and 20 parts of a water-soluble melamine-formaldehyde condensate, was only 30 per cent soluble in water when heated at 105° C. for 15 minutes, as compared with a value of about 95 per cent solubility for the freshly deposited, air-dried but unheated film. Similarly, a water solution of 80 parts of sodium cellulose glycolate and 20 parts of a water-soluble melamine-formaldehyde condensate gave films which, when heated to 105° C. for 15 minutes, were only 35 per cent soluble in water under the standard test conditions, as compared with 100 per cent solubility for the air-dried but unheated film.

In addition to the decrease in solubility in water characterizing the heated films of the present invention, these films are completely insoluble in mineral spirits, and substantially so in most common organic solvents.

Substantially insolubility is obtained when the films, heated as described, are cast from neutral or even from slightly alkaline solutions, but maximum insolubility under any given heating conditions is obtained when the films are deposited from solutions having pH of from 4 to 5. A suitable acidulating agent for obtaining this pH and for accelerating the insolubilization reaction is phosphoric acid, though other acids, such as citric acid, oxalic acid, and the like, are also suitable.

The particular water-soluble melamine resin described in detail is a condensate of melamine, formaldehyde and diethylene glycol. Other water-soluble melamine resins may be obtained from melamine and formaldehyde, acetaldehyde, furfuraldehyde, and the like, modified subsequent to the initial condensation, if necessary, with glycol, glycerol, diethylene glycol, or other polyhydric alcohol. So long as the melamine resin is heat-hardenable and is soluble in water, it is included in the scope of the present invention, regardless of its specific composition.

The invention may be used to convert water-soluble cellulose ethers to water-insoluble products other than the films herein described. Thus, it may apply to filaments, tapes, or coatings provided that the coated article can withstand the temperature employed when heating the film to produce insolubility. When operating in the preferred ranges of proportion, time, and temperature, the treated films are flexible, substantially insoluble, and are practically free from discoloration.

In the foregoing description, reference is had to the addition of the melamine resin to the aqueous cellulose ether solution. It is to be understood that an equivalent operation, and one intended to be included in the scope of the claims, comprises dissolving a water-soluble cellulose ether in an aqueous solution of a melamine resin. Yet another equivalent operation is the mixing of water solutions of the two ingredients.

We claim:

1. The method which includes: forming a water solution of a water-soluble cellulose ether and a water-soluble, heat-hardenable melamine-aldehyde resin which has been modified by condensing with a polyhydric alcohol, said resin being present in an amount of from 2 to 15 per cent of the total weight of resin and cellulose ether; vaporizing the water from the solution; and heating the dry composition remaining at a temperature between about 90° and 170° C. for a period correspondingly in the range from about 60 to about 5 minutes, sufficient substantially to insolubilize the dried composition.

2. The method as claimed in claim 1, wherein the melamine resin is a melamine formaldehyde resin in amount from 5 to 15 per cent of the total weight of resin and cellulose ether.

3. The method which includes: forming a water solution of a water-soluble methyl cellulose and a water-soluble heat-hardenable melamine-formaldehyde-glycol condensate, said condensate being present in an amount from 5 to 15 per cent of the total weight of resin and methyl cellulose; vaporizing the water from the solution; and heating the dry composition remaining at a temperature between about 90° and 170° C. for a period correspondingly in the range from about 60 to about 5 minutes, sufficient substantially to insolubilize the dried composition.

4. The method as claimed in claim 1, wherein there is added to the water solution a small amount of acid sufficient to adjust the pH to about 4 to 5.

5. The method as claimed in claim 1, wherein the cellulose ether is water-soluble methyl cellulose.

6. The method as claimed in claim 1, wherein the dried article is heated to a temperature between about 105° and 110° C. for a period substantially to insolubilize the same.

7. The method which includes forming a water solution of a water-soluble cellulose ether and a water-soluble, heat-hardenable, polyhydric alcohol-modified melamine-formaldehyde resin prepared by reacting together about 6 moles of formaldehyde, about 3 moles of a polyhydric alcohol and about 1 mole of melamine, said resin being present in an amount of from 2 to 15 per cent of the total weight of the resin and cellulose ether vaporizing the water from the solution; and heating the dry composition remaining at a temperature between about 90° and about 170° C. for a period correspondingly in the range from about 60 to about 5 minutes, sufficient substantially to insolubilize the dried composition.

8. A substantially water-insoluble thermal reaction product of a water-soluble cellulose ether and a water-soluble heat-hardenable melamine-aldehyde-polyhydric alcohol condensate wherein the condensate is present in an amount of from 2 to 15 per cent of the total weight of condensate and methyl cellulose, said reaction product being identical with that obtained according to the method of claim 1.

SHAILER L. BASS.
RICHARD M. UPRIGHT.
FIRTH L. DENNETT.